United States Patent [19]

Weiswurm et al.

[11] Patent Number: 4,917,041
[45] Date of Patent: Apr. 17, 1990

[54] INFLATABLE MARKING DEVICE

[75] Inventors: Klaus D. Weiswurm, San Antonio; Hubert L. Risinger; Andrew B. Phillips, both of Kerrville, all of Tex.

[73] Assignee: R & P Enterprises, Kerrville, Tex.

[21] Appl. No.: 247,745

[22] Filed: Sep. 22, 1988

[51] Int. Cl.$^4$ .............................................. B64B 1/50
[52] U.S. Cl. .............................. 116/210; 116/DIG. 9; 242/96; 446/220; 446/224
[58] Field of Search .......... 116/210, DIG. 8, DIG. 9; 40/212, 214; 141/329; 206/573, 803; 222/5; 244/31, 33; 446/220, 222, 224; 242/125.1, 125.2, 125.3, 96

[56] References Cited

U.S. PATENT DOCUMENTS

| | | | |
|---|---|---|---|
| 2,218,931 | 10/1940 | Carlson | 222/5 |
| 2,343,276 | 3/1944 | Carlson | 141/329 |
| 3,094,807 | 6/1963 | Dorman | 446/222 |
| 3,108,396 | 10/1963 | Dorman | 446/220 |
| 3,207,394 | 9/1965 | Claridge | 242/125.2 |
| 3,236,005 | 2/1966 | Tomosy et al. | 446/222 |
| 3,310,024 | 3/1967 | McConnell | 116/210 |
| 3,735,723 | 5/1973 | Lutz | 116/210 |
| 4,560,360 | 12/1985 | Isaacs et al. | 446/222 |
| 4,602,751 | 7/1986 | Vogel | 242/118.4 |
| 4,787,575 | 11/1988 | Stewart | 244/33 |

FOREIGN PATENT DOCUMENTS 49508 12/1972 Japan .................................. 242/125.2
8606041 10/1986 PCT Int'l Appl. .................. 244/33

OTHER PUBLICATIONS

*Petersen's Hunting Magazine*, Apr. 1988, p. 52, Ad for Emergency Locator Signal Pak.

*Primary Examiner*—William A. Cuchlinski, Jr.
*Assistant Examiner*—W. Morris Worth
*Attorney, Agent, or Firm*—Cox & Smith Incorporated

[57] ABSTRACT

An inflatable marking device for marking a position comprising an inflatable balloon for receiving a lighter than air gas for inflating the balloon to cause the balloon to rise to mark a position. A line is secured at one end around the throat of the balloon and at the other end to a handle to maintain the balloon at the desired position. The handle is provided with a nipple for receiving the throat of the balloon, a spool around which the line is wound, and a shoulder to keep the line from overlapping onto the nipple when unwinding the line from the spool. One end of the handle is an opening for sealing around a gas cartridge when the cartridge is inserted therein, and a pin valve is positioned within the opening for engaging the cartridge to cause the gas to escape from the cartridge, through the nipple, and into the balloon.

12 Claims, 2 Drawing Sheets

INFLATABLE MARKING DEVICE

BACKGROUND OF THE INVENTION

The present invention relates to an inflatable device for marking a position. More particularly, the present invention relates to a lightweight, compact device which is easily transported and which can be assembled quickly and conveniently in an emergency to inflate a balloon with a lighter than air gas to cause the balloon to rise so that the balloon can be located from a distance.

Such a device is particularly useful to the various types of outdoorsmen who spend recreational and occupational time in wooded and/or isolated areas in which there is always a concern as to how to get help when an accident occurs. That concern is even greater in the case of a person alone in that type of terrain. In the event of injury in such terrain, the individual himself must send a distress signal. Because of the tree coverage in heavily wooded areas, that signal must be elevated above the forest canopy. One method which is commonly used to do so is to fire a flare. However, a flare is a short term marker and the wind often scatters the flare's signal. By the time a search party found the person who fired the flare, the person could already be in a life threatening situation.

The use of the present invention is not confined, however, to distress situations in the forest. There are times when, for instance, it is desired to mark a position so that a person can locate that position from a distance to return to that position. There are also objects which may move which need to be located. Further, disabled or injured boaters need a marking device which can be seen from a distance and which will attract attention to the location of the watercraft.

It is, therefore, an object of the present invention to provide a device which can shorten the amount of time required to find a person or object by enabling a person to pinpoint the position of the person or object.

Another object of the present invention is to provide a marking device that is capable of being seen above the trees in a wooded area.

Another object of the present invention is to provide a device which is not blown away from the location of the position to be marked.

Still another object of the present invention is to provide a device that can be assembled with a limited amount of movement to enable an injured person to use the device to mark a position.

These and other objects, features and advantages of the present invention will become apparent to those skilled in the art after reviewing the following detailed description in conjunction with the referenced drawings of an inflatable marking device constructed in accordance with the invention.

SUMMARY OF THE INVENTION

An inflatable marking device for marking a position comprising an inflatable balloon for receiving a lighter than air gas for inflating the balloon to cause the balloon to rise and mark a position and having a line secured around the throat thereof for holding the balloon at the position to be marked. An elongated handle is provided with a nipple at one end thereof for receiving the throat of the balloon thereon and having a spool at the other end thereof around which the line is wound. Means is formed within the handle for sealing around a cartridge containing the lighter than air gas for inflating the balloon when the cartridge is inserted therein which is provided with a means for engaging the gas cartridge to cause the gas to escape from the cartridge, through the nipple, and into the throat of the balloon, thereby inflating the balloon.

Also provided is a method of marking a position using the inflatable marking device. The method involves inserting a cartridge containing a lighter than air gas into an opening in the end of the handle, thereby releasing the gas from the cartridge, and routing the gas released from the cartridge through a passageway in the handle into a balloon, thereby inflating the balloon with the gas. The inflated balloon is then removed from the handle, the throat of the balloon is sealed, and a line is secured to the balloon and the handle. The line is then unwound from the handle until the balloon rises to a desired elevation and the handle secured to the position to be marked to prevent movement therefrom.

DETAILED DESCRIPTION OF THE INVENTION

Figure 2:
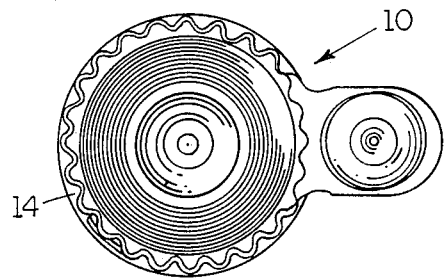
FIG. 2 is a bottom view of the device of FIG. 1 in which the cap of the carrying case has been removed from the bottom thereof.
Figure 3:
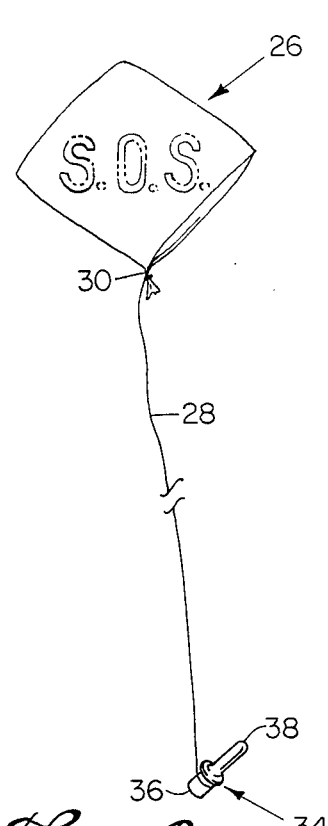
FIG. 3 is a perspective view of the device of FIG. 1 in use to mark a position.
Figure 1:
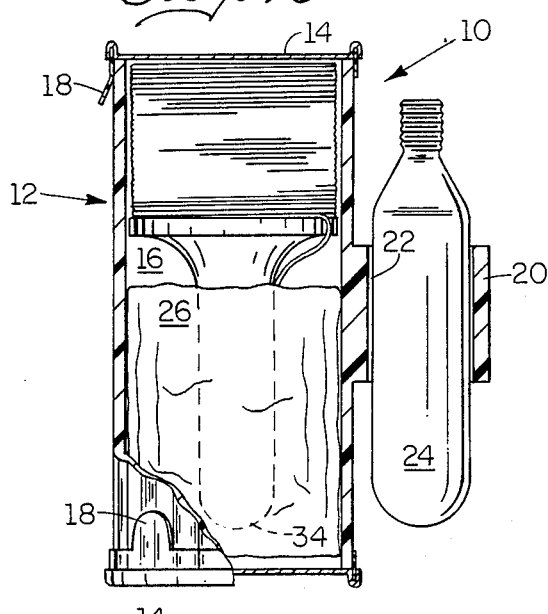
FIG. 1 is a longitudinal sectional view of an inflatable marking device that is packaged within a carrying case and is constructed according to the teachings of the present invention.

Referring first to FIGS. 1, 2, and 3, a presently preferred embodiment of an inflatable marking device constructed in accordance with the present invention is indicated at reference numeral 10. Inflatable marking device 10 is packaged in a carrying case 12 which is compact and which holds the parts of the inflatable marking device 10 in close proximity so that assembly thereof can be accomplished quickly and with a minimum amount of movement. Carrying case 12 is provided with caps 14 at the top and bottom thereof for sealing device 10 within the compartment 16 thereof. Caps 14 are provided with tabs 18 and are constructed in a "zip top" configuration so that they can be quickly removed to open compartment 16 when the need arises. One side of carrying case 12 is provided with an extension 20 having an opening 22 therein for receiving gas cartridge 24. Gas cartridge 24 is frictionally engaged by extension 20 when inserted into opening 22, and because carrying case 12 is, preferably constructed of a resilient, durable plastic, that frictional engagement is sufficient to insure retention of gas cartridge 24 in close proximity to the device 10 in compartment 16.

The inflatable marking device 10 is comprised of an inflatable balloon 26 for receiving a lighter than air gas for inflating balloon 26 to cause balloon 26 to rise to mark a position. A line 28 is secured around the throat 30 of balloon 26 for holding balloon 26 at the position to be marked. Line 28 is secured to balloon 26 with a clip 32 around the throat 30 thereof. Balloon 26 is preferably constructed of a light reflective material which is durable and puncture resistant, and the synthetic polymer sold under the brand name MYLAR has been found to be particularly suited for this use. Balloon 26 is generally rectangular to decrease the amount of wind resistance presented, thereby helping to keep balloon 26 positioned directly over the position to be marked.

Figure 8:
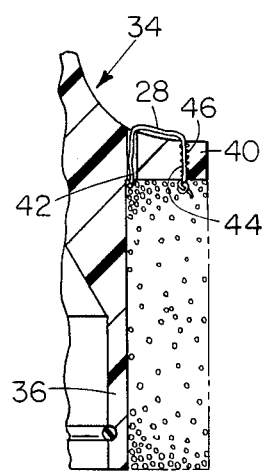
FIG. 8 is an elongated sectional view through a portion of the handle of the device of FIG. 1.
Figure 4:
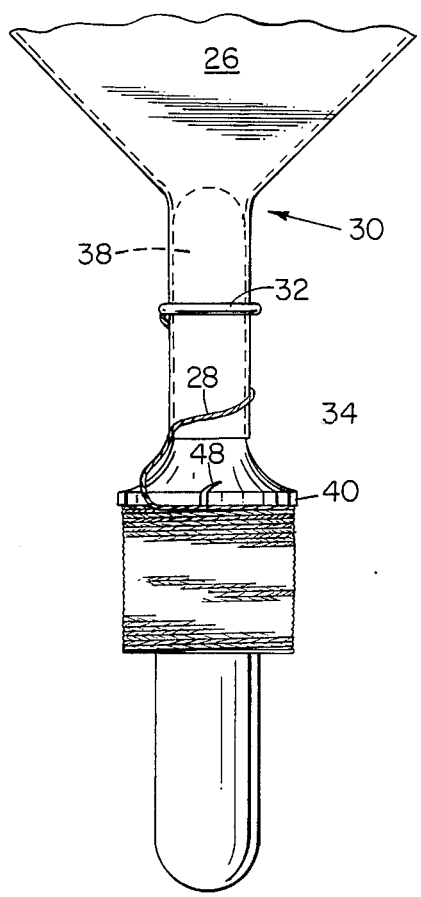
FIG. 4 is an elevational view of the device of FIG. 1 after the balloon has been inflated but before removing the balloon from the nipple thereof.
Figure 6:
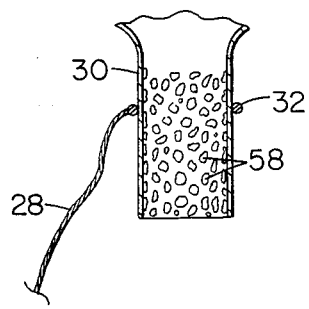
FIG. 6 is a longitudinal sectional view through a portion of the throat of the balloon of the device of FIG. 1 after the balloon has been inflated and removed from the nipple.
Figure 7:
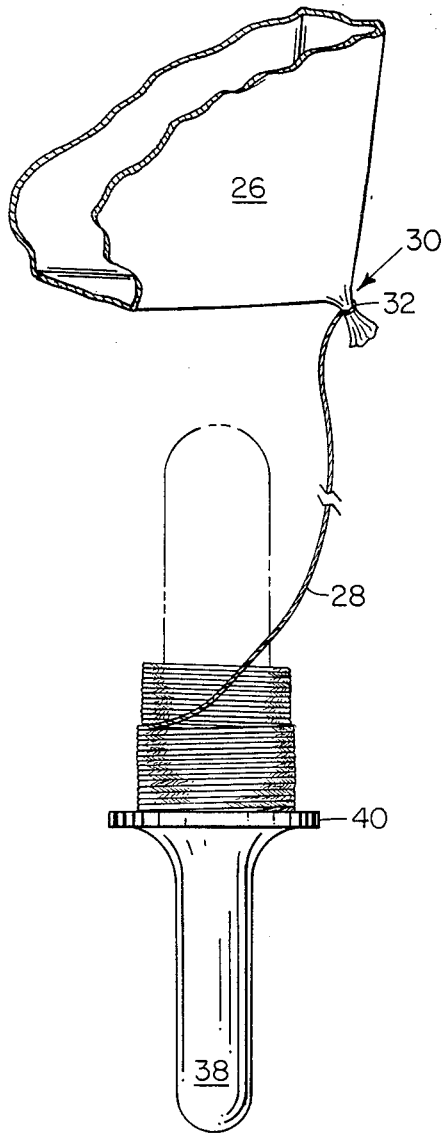
FIG. 7 is an elevational view of the device of FIG. 1 as the line secured to the inflated balloon is being unwound from the spool thereof.

Line 28 is secured at the other end to a handle 34 comprised of a spool 36 formed at one end thereof and a nipple 38 formed at the other end for receiving the throat 30 of balloon 26. Line 28 is secured to handle 34 by wrapping line 28 around spool 36 (see FIGS. 5 and 8). Shoulder 40 is formed at one end of spool 36 for preventing the overlapping of line 28 onto handle 34 when unwinding line 28 from spool 36. Means is also provided for securing line 28 to handle 34 to prevent balloon 26 from detaching from handle 34 when line 28 is unwound from spool 36 in the form of holes 42 and 44 through shoulder 40 having means therein for providing one way directional movement of line 28 therethrough in the form of cletes 46 (see FIG. 8). Thus line 28 is threaded up through hole 42, out of shoulder 40 towards nipple 38, and then back through hole 44 towards spool 36. Shoulder 40 is also provided with means for anchoring line 28 off on shoulder 40 in the form of V-notch 48. After line 28 is unwound from spool 36 to allow balloon 26 to rise to mark a position, handle 34 is looped around a stationary object and line 28 inserted into V-notch 48 so that V-notch 48 anchors line 28 onto shoulder 40.

Figure 5:
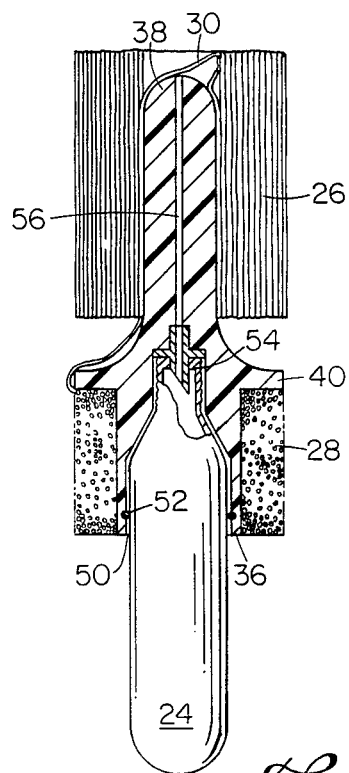
FIG. 5 is a longitudinal sectional view of the device of FIG. 1 after the gas cartridge has been inserted into the handle and before the balloon has been inflated.

Referring to FIG. 5, the spool 36 formed in one end of handle 34 is provided with means formed therein for sealing around cartridge 24 containing the lighter than air gas for inflating balloon 26 when cartridge 24 is inserted therein in the form of an opening 50 at the end of handle 34. The diameter of opening 50 is sized to frictionally engage and seal around cartridge 24 when cartridge 24 is inserted therein and the inside surface of opening 50 is provided with an O-ring 52 for helping to create an air-tight seal around cartridge 24.

Handle 34 is also provided with means for engaging cartridge 24 to cause the gas contained therein to escape from cartridge 24 through nipple 38 into throat 30 of balloon 28 in the form of pin valve 54 at the top of the opening 50 of handle 34. Pin valve 54 is continuous with a passageway 56 through nipple 38 for routing the gas from cartridge 24 into the throat 30 of balloon 26. As can be seen in FIGS. 3, 4, 6 and 7, when balloon 26 is inflated, the throat 30 is removed from nipple 38. Throat 30 must then be sealed to prevent the escape of gas from balloon 26. Sealing the throat 30 is accomplished by applying sufficient pressure to throat 30 to rupture the microcapsules of adhesive 58 located therein, causing throat 30 to be effectively glued closed. Clip 32 can be flattened against throat 30 to likewise prevent the escape of gas from balloon 26.

Referring to FIGS. 1 and 2, it can be seen that when the device 10 is packaged in the compartment 16 of carrying case 12, balloon 26 is folded and wound around nipple 38. When it is desired to use the inflatable marking device 10, the device 10 is removed from compartment 16 and balloon 26 shaken or unfolded from around nipple 38.

Inflatable marking device 10 is assembled by inserting cartridge 24 into the opening 50 in the end of handle 34 and seating the end 60 of cartridge 24 against pin valve 54. Pin valve 54 then engages cartridge 24 to release the gas from cartridge 24 and the passageway 56 in handle 34 routes the gas into balloon 26, thereby inflating balloon 26. The inflated balloon 26 is removed from handle 34 and the throat 30 is sealed by, for instance, pressing throat 30 of balloon 26 between two fingers. Line 28 is wound off of from handle 34 until balloon 26 rises to a desired elevation, and handle 34 can then be secured to the position or object to be marked by, for instance, looping handle 34 around the position or object and anchoring line 28 off on the V-notch 48 in the shoulder 40 thereof as described above.

Although the invention has been described in terms of the above-described presently preferred embodiment, it will be recognized by those skilled in the art who have the benefit of this disclosure that a variety of changes and alterations could be made to this device without changing its intended purpose and function. It is expected that all such changes and modifications will fall within the spirit and scope of the following claims.

What is claimed is:

1. A device for inflating a balloon with a line attached thereto, comprising:
   an elongate member having a spool formed at a first longitudinal end thereof for having a line wound thereon, which line is attachable at a first end to a balloon;
   said elongate member further having a handle formed at a second longitudinal end thereof for enabling gripping of said elongate member while said line unwinds from said spool, said handle being adapted to receive the throat of a balloon thereon;
   said elongate member further having an opening formed in the first longitudinal end thereof for sealingly receiving a cartridge containing lighter-than-air gas;
   said elongate member further having a passageway through said handle for enabling communication of the gas from said opening through said handle; and
   means formed with said elongate member in said opening for engaging the cartridge sealingly received in said opening in a manner which causes the gas therein to escape through said passageway and into a balloon, the throat of which is received on said handle, thereby inflating said balloon.

2. A device as in claim 1 further comprising means for attaching a second end of the line to said elongate member.

3. The device of claim 1 wherein said opening includes a space formed central to said spool in the first longitudinal end of said elongate member.

4. The device of claim 1 wherein said spool is concentric with the longitudinal axis of said elongate member and is open at the first longitudinal end of said elongate member for enabling unwinding of said line therefrom.

5. The device of claim 1
   wherein said first end of said line is secured around the throat of said balloon for holding said balloon within a certain distance from the elongate member.

6. The device as claimed in claim 5, further comprising a pressure-sensitive adhesive for sealing the throat of said balloon.

7. A device as claimed in claim 1 wherein said elongate member is further provided with a shoulder for preventing the overlapping of said line onto said handle.

8. The device as claimed in claim 7, further comprising means for securing a second end of said line to the shoulder of said handle, said securing means being formed integral with said elongate member.

9. The device as claimed in claim 8 wherein said securing means comprises a hole through the shoulder which has means for providing one-way directional movement of said line therethrough.

10. The device as claimed in claim 7 further comprising means for anchoring said line on said shoulder.

11. A method of marking a position with a balloon comprising the steps of:

flowing a lighter-than-air gas through a nipple at a second end of an elongate member into the open throat of a balloon surrounding the nipple, thereby inflating the balloon with the gas, which elongate member has a line wound thereon which is secured at one end of said line to the balloon and at the other end to the elongate member;

removing the open throat of the inflated balloon from the nipple;

sealing the open throat of the balloon; and after removing the inflated balloon, gripping the nipple in a manner such that the elongate member is positioned sufficiently vertically to allow the line to unwind from the opposite end thereof.

12. The method of claim 11 further comprising the step of:

securing the elongated member to the position to be marked, thereby preventing movement of the balloon from the position.

* * * * *